Sept. 18, 1934.  A. G. W. WEDBERG  1,974,130
FINISHING STRUCTURE AND THE LIKE
Filed March 6, 1931  5 Sheets-Sheet 1
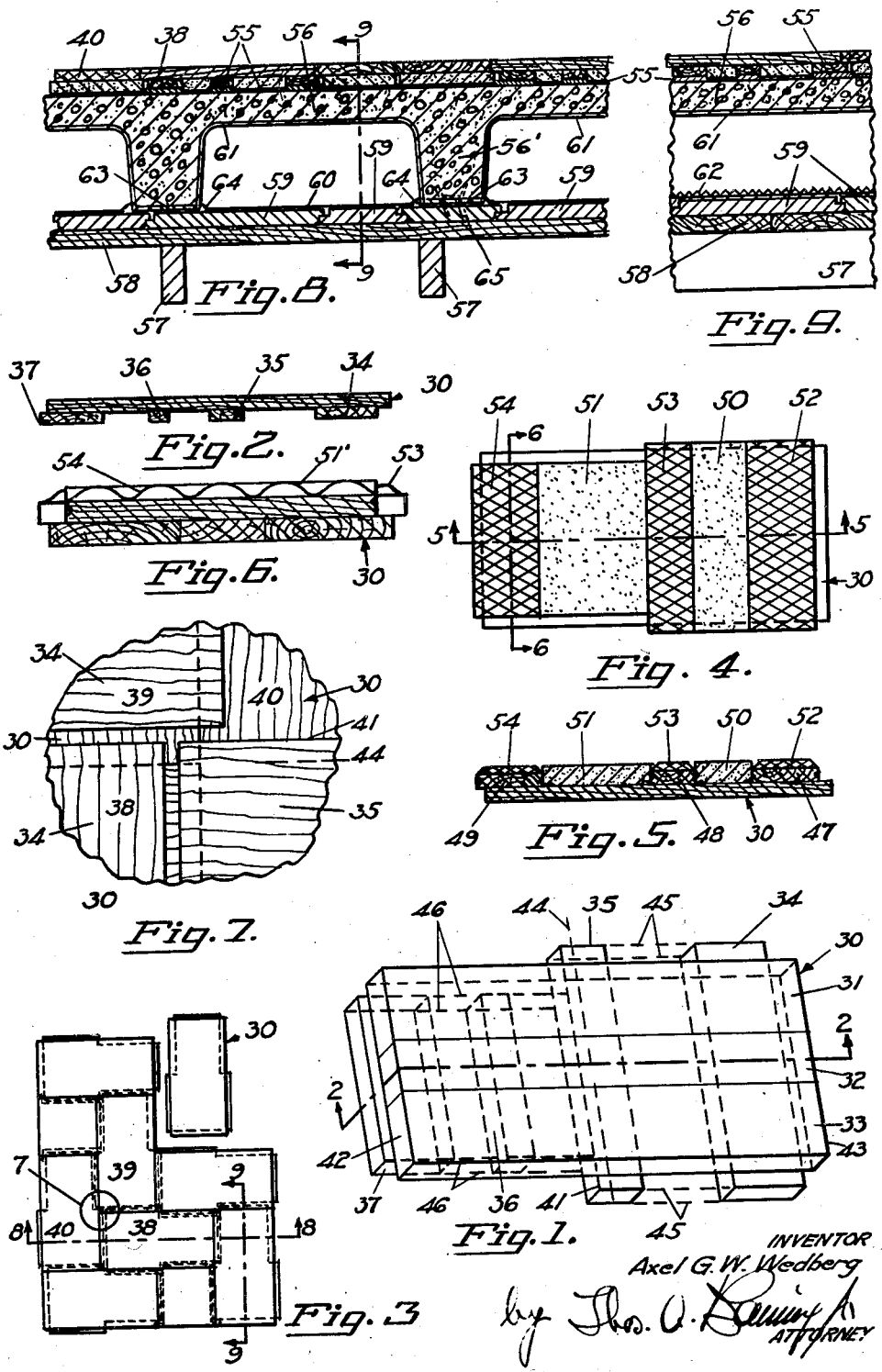
INVENTOR
Axel G. W. Wedberg
by Thos. O. [illegible]
ATTORNEY Sept. 18, 1934.   A. G. W. WEDBERG   1,974,130
FINISHING STRUCTURE AND THE LIKE
Filed March 6, 1931   5 Sheets-Sheet 2
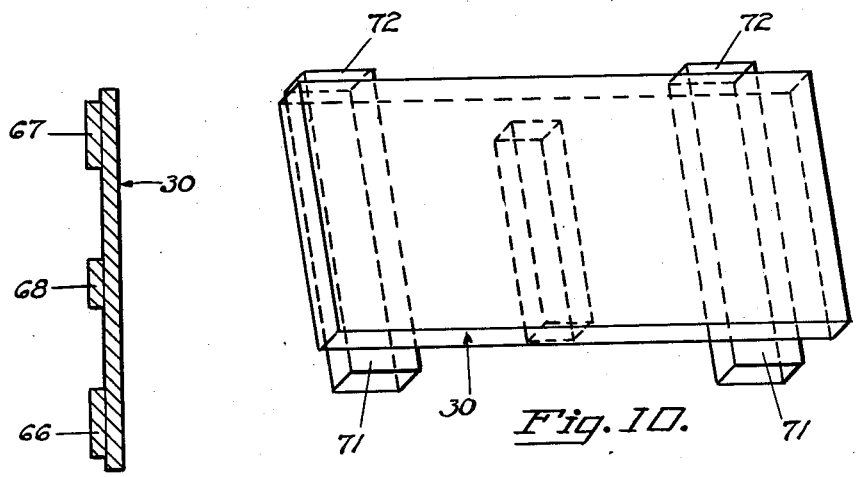
Fig. 10.
Fig. 12.
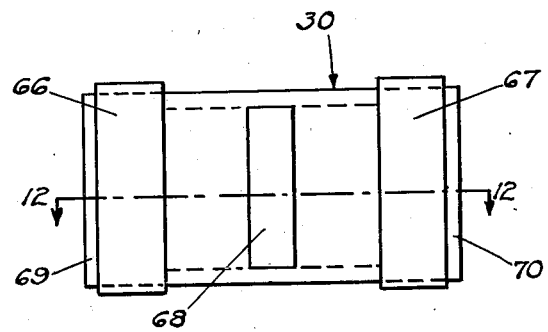
Fig. 11.
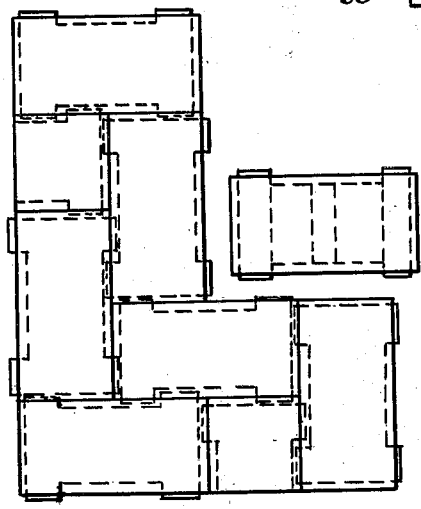
Fig. 13.
INVENTOR
Axel G. W. Wedberg
ATTORNEY Sept. 18, 1934.  A. G. W. WEDBERG  1,974,130
FINISHING STRUCTURE AND THE LIKE
Filed March 6, 1931   5 Sheets-Sheet 3

INVENTOR
Axel G. W. Wedberg
by Thos. A. Dennis
ATTORNEY

Sept. 18, 1934.  A. G. W. WEDBERG  1,974,130
FINISHING STRUCTURE AND THE LIKE
Filed March 6, 1931    5 Sheets-Sheet 4

INVENTOR
Axel G. W. Wedberg
by Thos. A. Banning Jr.
ATTORNEY

Sept. 18, 1934.  A. G. W. WEDBERG  1,974,130
FINISHING STRUCTURE AND THE LIKE
Filed March 6, 1931  5 Sheets-Sheet 5
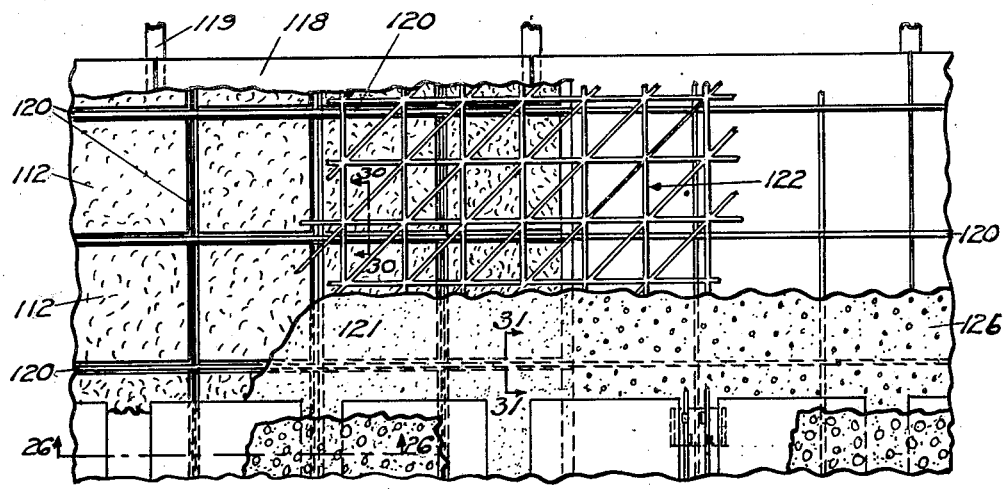
Fig.27.
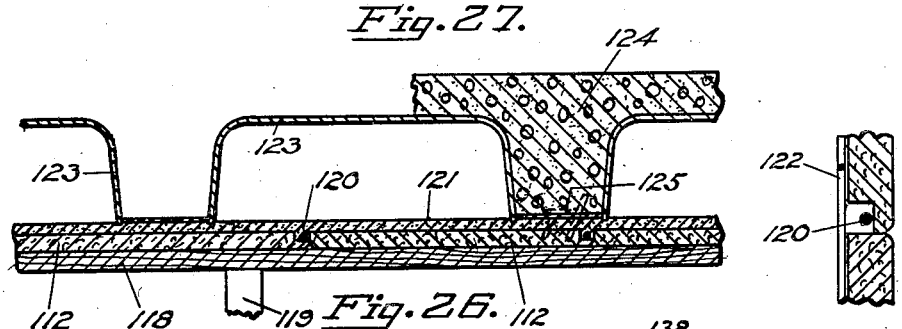
Fig.26.
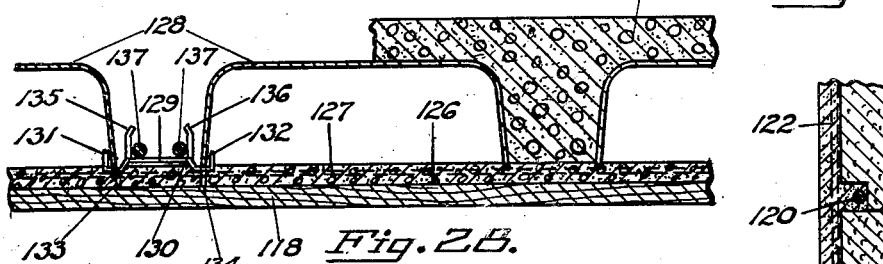
Fig.28.
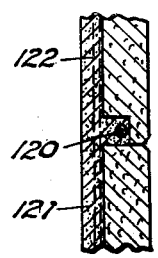
Fig.30.
Fig.31.
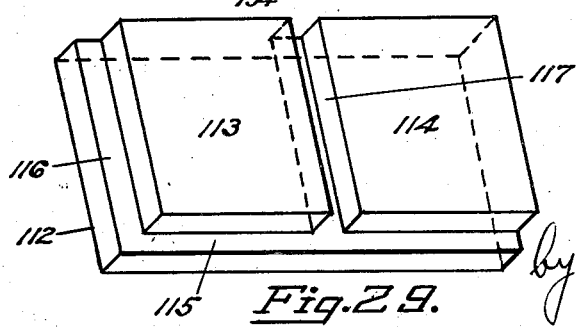
Fig.29.
INVENTOR
Axel G. W. Wedberg
by Thos. A. Banning Jr.
ATTORNEY Patented Sept. 18, 1934

1,974,130

UNITED STATES PATENT OFFICE 1,974,130

FINISHING STRUCTURE AND THE LIKE

Axel G. W. Wedberg, Chicago, Ill.

Application March 6, 1931, Serial No. 520,527

14 Claims. (Cl. 20—7)

The present invention has to do with improvements in the finishing of structures such as floors, walls, partitions, ceilings, and other similar structures. The features of the invention relate particularly to improvements in the construction and use of blocks or tiles or insulating boards which are attached to and become permanently connected to the structure and constitute the surface finish thereof.

The blocks herein disclosed are especially adapted and intended for use in connection with floor constructions, but it will also appear that they can very well be used for the finishing of walls or partitions or ceilings, as well as in some cases exterior surfaces of buildings and other structures.

One object of the invention is to provide a form and arrangement of blocks which are so constructed that when they are set together edge to edge in order to establish the completed surface, their edge portions interlock with each other in such a manner as to retain the successive blocks with their surfaces in firm and exact alignment with each other. That is to say, the edge portions of the consecutive blocks are so interlocked with each other that the blocks are retained against relative displacement or slippage with respect to each other at their edges and in a direction at right angles to their exposed surfaces. This feature is of great benefit or advantage for the reason that it insures the permanency of alignment of the blocks used in producing the finished surface of the floor or other structure. The interlocking feature above referred to is produced by a peculiar interchangeable and relatively coordinated forming of the entire peripheral portions of all of the blocks, so that the blocks are relatively interlockable in their edge portions around the entire periphery of each block, and all of the blocks are of the same standard form and construction. This feature is to be clearly distinguished from the ordinary tongue-and-groove board construction as will be apparent from the disclosures hereinafter set forth.

In connection with the foregoing, it is an object of the invention to provide blocks which are relatively interlockable in their edge portions, whether said blocks have their exposed surfaces square or oblong—that is, of greater dimension in one direction than the other. Generally the blocks will be of rectangular form, but in some cases, other shapes may be used, as, for example, blocks of hexagonal or other symmetrical forms.

Another feature of the invention relates to the provision of block constructions which are of such a nature that a cushioning effect is produced when the blocks are permanently set into the asphalt or other mastic. This asphalt or other mastic is generally interposed between the blocks and the concrete or other sub-floor, or other permanent structure to which they are attached by the mastic. In some cases the blocks may also be nailed or similarly secured in place, since their edge portions are so formed as to adapt them very well to this form of attachment.

In connection with the foregoing, the cushioning effect is produced by strips or portions of relatively cushionable material such as celotex or other fibrous material secured to the back surfaces of the blocks themselves and which strips may also constitute a portion of the interlocking elements of the blocks. These cushioning strips when so used are relatively much more yieldable than the wood or other material of which the blocks and strips are formed. I therefore prefer to make these yieldable sections or strips of greater thickness than the intermediate relatively non-yieldable sections so that when the blocks are set into the asphalt or other mastic, there will be a greater depth or thickness of said asphalt or mastic at the sections between the strips of celotex or other yieldable material. As a result thereof, there will be an increased thickness of the asphalt or mastic at the positions between the yieldable strips, and since the asphalt or mastic itself is relatively yieldable there will be produced an attachment or support of improved cushioning aspect throughout the entire area of the blocks.

It is a further object to produce a corrugated metal lath bond of the blocks to the sub-floor without having the mastic bond directly to the hard underside of the blocks by attaching corrugated metal lath to the back surfaces of the blocks in permanent manner, with only the lower portions of the corrugations of the metal lath imbedded in the mastic leaving the upper portion of the metal lath free from mastic so that it will compress and expand easily and thereby securing the advantage of a firm connection between the flooring blocks and the asphalt or other mastic, at the same time producing a cushioning effect under the flooring blocks.

A further feature of the invention relates to the provision of block constructions in which the supporting areas of the celotex or other relatively cushionable material are larger than the intermediate non-cushionable areas, and in fact in which the cushionable areas constitute a great majority and maximum portion of the total supporting surface so that a maximum benefit is produced therefrom. Nevertheless, it is desirable to also provide the intermediate surfaces to which or at which the asphalt or other bonding mastic may produce its maximum bonding action, for securing the blocks in place. This is desirable for the reason that although the celotex or other similar material will bond firmly to the asphalt or other mastic, still said celotex or the like, due to its fibrous nature, will tear or pull apart more readily than is desirable in some cases, so that it is desirable to provide additional bonding or attachment surfaces to which the asphalt or other mastic may adhere.

Another feature of the invention relates to the provision of block or similar construction of such a nature that there is produced a very beautiful and attractive appearing finish to the surface produced thereby. In this connection, the blocks herein disclosed may be set into many beautiful forms and designs of floor or ceiling or wall constructions, so as to produce beautiful parquet finishes.

In connection with the foregoing, it is a further feature of the invention that by the use of the block constructions herein disclosed, I am enabled to make use of the more valuable and expensive wood materials, and those which present the most beautiful finishes for the finished surface portions of the blocks, making use of less attractive or finished desirable materials for the interlocking strips and other portions of the blocks which do not show when the blocks are set into place. Likewise, it is possible to use the better portions of the lumber for the exposed portions of the blocks, and the less desirable cuts or portions of the lumber may be used for strips or for back or concealed portions.

Another feature of the invention relates to the provision of arrangements whereby it is possible to build floor and ceiling constructions incorporating blocks having the features of the present invention. The ceilings thus produced may be made from blocks of wood, celotex, or other suitable material of a fibrous or sound insulating quality, so as to materially deaden and obstruct the transmission of sound. In connection with the foregoing, it is an object to provide a system of building construction whereby the ceiling and the concrete of other mould floor above may be built up by a system of construction and procedure which makes it possible to greatly reduce the cost of construction while at the same time producing a structure having the finished ceiling embodying the features of the present invention.

Other objects and uses of the invention will appear from a detailed description of the same which consists in the features of construction and combinations of parts hereinafter described and claimed.

In the drawings:

Figure 1 shows a perspective view looking down on the top or exposed face of a typical surfacing block embodying the features of the present invention, the same being of rectangular and oblong form;

Figure 2 shows a longitudinal section on the line 2—2 of Figure 1, looking in the direction of the arrows;

Figure 3 shows a face view of a section of parquet flooring built up by the use of blocks of the form shown in Figures 1 and 2;

Figure 4 shows a bottom face view of a block similar to that of Figure 1, with the exception that it is provided with strips of celotex and also intermediate wood strips which are faced with expanded metal;

Figure 5 shows a longitudinal section on the line 5—5 of Figure 4, looking in the direction of the arrows;

Figure 6 shows a cross section on the line 6—6 of Figure 4, looking in the direction of the arrows;

Figure 7 shows a fragmentary back face view of one of the interlocking corners of the blocks set together in Figure 3, being the corner shown within the line 7 of Figure 3;

Figure 16:
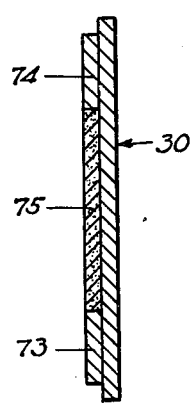
Figure 14:
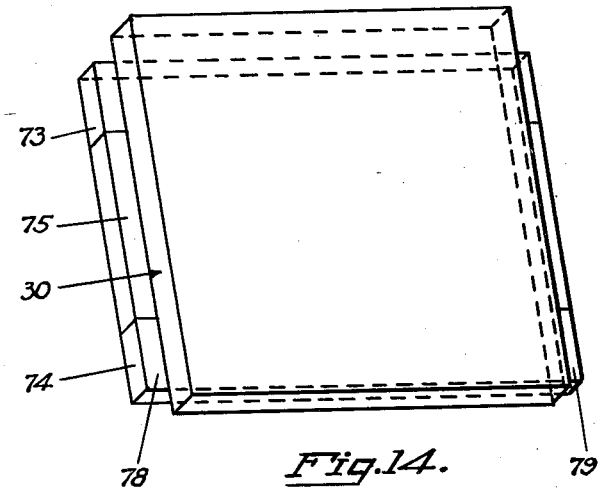
Figure 15:
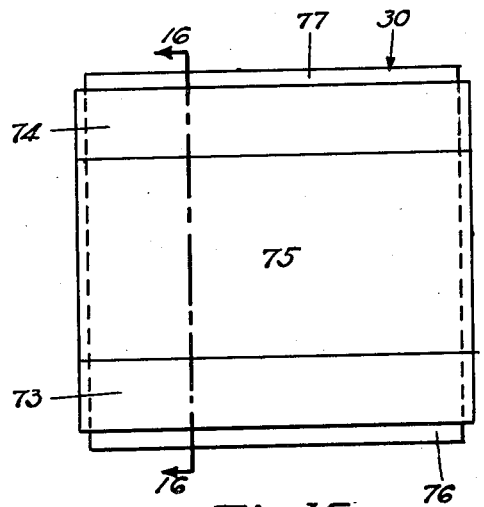
Figure 17:
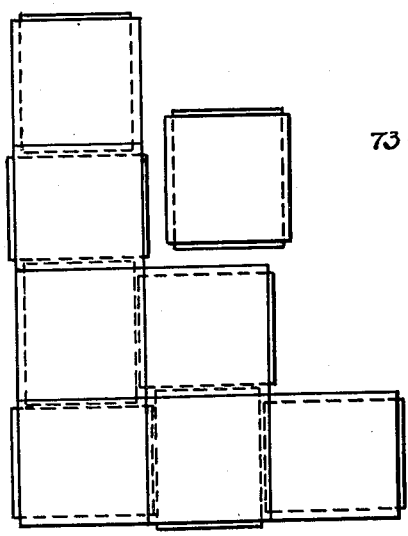

Figure 8 shows a fragmentary section of a portion of ceiling construction made up by the use of blocks embodying the features of the present invention, showing how the ceiling blocks may be supported by the forms, and how the concrete floor structure may be poured in place thereon, and how the floor structure above may be thereafter placed on the concrete floor thus established, and Figure 8 may be considered as a section on the line 8—8 of Figure 3, looking in the direction of the arrows, but on enlarged scale;

Figure 9 shows a cross section on the line 9—9 of Figure 8, looking in the direction of the arrows and may also be considered as a section on the line 9—9 of Figure 3, looking in the direction of the arrows, but on enlarged scale;

Figure 10 shows a perspective view similar to that of Figure 1, but illustrating a modified construction of the block;

Figure 11 shows a back face view corresponding to Figure 10;

Figure 12 shows a longitudinal section on the line 12—12 of Figure 11, looking in the direction of the arrows;

Figure 13 shows a view similar to that of Figure 3, but illustrating a section of flooring made up from blocks of the type shown in Figures 10, 11, and 12;

Figure 14 shows a perspective view of still another modified form or construction of block;

Figure 15 shows a back face view corresponding to Figure 14;

Figure 16 shows a cross section on the line 16—16 of Figure 15, looking in the direction of the arrows;

Figure 17 shows a view similar to that of Figures 3 and 13, but illustrating a section of floor made from blocks of the type shown in Figures 14, 15, and 16.

Figure 25:
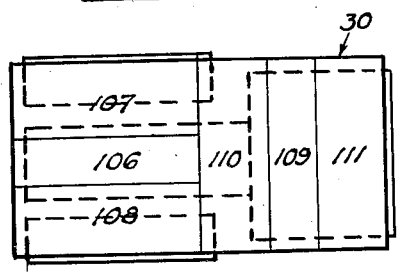
Figure 24:
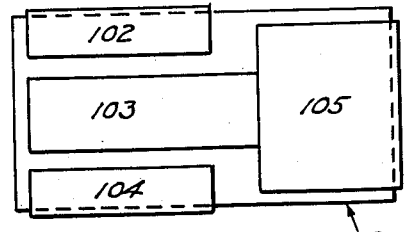

Figures 18, 19, 20, 21, 22, 23, and 24, show back face views of modified forms of block, all embodying the features of the present invention;

Figure 25 shows a front face view of the form of block shown in Figure 24;

Figure 26 shows a fragmentary vertical cross section through a portion of a concrete floor structure having connected thereto a ceiling structure embodying certain features of the present invention, the forms for the ceiling structure being still in place, and only a portion of the concrete being poured; and Figure 26 may be considered as a section on the line 26—26 of Figure 27, looking in the direction of the arrows;

Figure 27 is a plan view corresponding to Figure 26;

Figure 28 shows a view similar to Figure 26, except showing a modified form of construction;

Figure 29 shows a perspective view of the blocks used in the construction of the ceiling of Figure 26;

Figure 30 shows a fragmentary section on the line 30—30, of Figure 27, looking in the direction of the arrows; and Figure 31 shows a fragmentary section on the line 31—31 of Figure 27, looking in the direction of the arrows.

Referring first to the form of construction shown in Figures 1 to 7, inclusive, in this case the block is of rectangular form and includes a surface block or element designated in its entirety by the numeral 30. The same is rectangular and relatively thin and is made up of wood or material of the grade and quality which it is desired to use for the exposed surface of the floor, wall ceiling or other structure which is being finished. In the particular form shown in Figures 1 to 7, the surface block 30 actually comprises strips 31, 32, and 33, laid side by side; but manifestly a single strip or plate can be used in place thereof.

Secured to and extending across the back or concealed face of the strip or plate 30 is a series of other blocks or strips designated 34, 35, 36, and 37. These may be made of relatively less desirable material or even of different material from the plate 30. Thus, for example, the strips 34, 35, 36, and 37 may be made of waste material cut during the various manufacturing processes, or may be made of entirely different material as will be evident from a consideration of the matter.

In those cases in which the plate 30 is made of a series of distinct strips such as 31, 32, and 33, the strips 34, 35, 36 and 37 will also serve the function of joining the strips 31, 32 and 33, together or the function of improving the connection and joining thereof. Furthermore, the strips 34, 35, 36, and 37 may be nailed or glued or both, or by any other manner secured to the plate 30. In some cases the plate 30 and the cross portions may be formed or moulded as an integral unit as will be presently apparent.

It will be noted that the strips 34 and 35 project beyond the side edges of the plate 30, whereas the strips 36 and 37 terminate short of said side edges. It will also be noted that the strip 34 is set back from the end of the plate 30, whereas the strip 37 projects endwise beyond the end of the plate 30. The result is that there is produced a complete block having its top and bottom edges alternately projecting beyond and recessed beneath each other, so that as the perimeter of the entire block is encircled, the edge portions thereof are alternately recessed under the top surface and extend beyond the top surface so that an interlocking perimeter is produced which is perfectly symmetrical around the entire perimeter of the finished block. Thus, for example, at the right hand end the perimeter is recessed under the top surface; then proceeding around the block in either direction, the bottom portion of the block projects beyond its top portion on one side, then the top portion projects beyond the bottom portion on that side, then the other end of the block has its lower portion projecting beyond its upper portion, then proceeding along the final side of the block, the lower portion is recessed beneath the top portion and finally the lower portion projects beyond the top portion of that side.

Another way of expressing the matter is to say that as one proceeds around the entire perimeter of a completed block, the exposed and concealed portions thereof project alternately and symmetrically beyond each other, with the limitation, however, that the exposed portion of the block itself is rectangular or perfectly uniform in shape and is not in itself at any point notched or provided with lugs in its exposed surface. The result is that the entire interlocking relation or portion of the block is produced within the bottom or concealed portion of the block, the top or exposed portion of the block being of perfectly regular form.

Referring to Figure 3, it will be evident that the blocks of the type shown in Figures 1 and 2 can be readily set together in such a manner as to produce a complete and finished flooring or other surface. During this operation, the end portions of the blocks are relatively so placed that a projecting edge of the under or concealed portion of a block is always inserted into the symmetrically recessed or contracted under portion or under portions of other blocks of the series so as to permit the upper or exposed face portion of all of the blocks to come into the direct and regular edge contact with each other so as to produce a perfectly continuous finished surface at all points; the alternately projecting and receding edge portions of the under or concealed portions of the blocks being interlocked with each other in what may be termed a "shiplap" arrangement. It is possible to produce this result because of the fact that the projecting and recessed portions of the under or concealed portion of each block are symmetrically formed measured around the entire perimeter thereof.

Although the setting of blocks shown in Figure 3 is one which may be designated a herringbone parquet setting, still it will be evident that the blocks of the types shown in Figures 1 and 2 may also be set together in numerous other arrangements of symmetrical form.

Examination of Figure 3 in particular reveals the fact that when the blocks are set together, their corner portions come into perfect registry with each of the adjacent edge contacting blocks of the series. Thus, for example, in Figure 3, the blocks 38, 39, and 40, come together around the corner which is shown in the enlarged back face detail of Figure 7. The side edges of the blocks 39 and 40 come together, and the end corner of the block 38 sets into the right angle produced by the end of the block 39 and the side edge of the block 40.

Referring again to Figure 1, the projecting edge 41 of the strip 35 in said figure is located closer to the end 42 of the plate 30 of said block than to the end 43 thereof. That is to say, the projecting portion or flange or lug of the lower portion of a block extends to a point closer to the other end of said block than to the end where said projection occurs. The result of this will be evident from examination of Figure 3, wherein it is evident that the projecting portion of the strip underlies not only the end of the block 38, but also reaches over far enough to overlie the end corner of the block 39. The amount of this overlap is substantially equal to the amount of projection of the strip 37 beyond the end 42 of a block which is also substantially equal to the amount by which the strip 34 is set back beneath the end 43 of said block. In other words, considering the exposed plate 30 of the block, the medial line thereof is shown at 44 in Figure 1, the edge 41 of the strip 35 extends beyond the medial line 44 an amount equal to the projection of the strip 37 beyond the end 42 which is also equal to the set back of the strip 34 behind the end 43. Some cases, the strip 37 may project beyond the end 42, and the strip 34 may be set back beneath the end 43 a greater distance than the distance of the edge 41 beyond the medial line 44, but the only effect thereof is that a full amount of overlap will not be produced at the corner of the block 39 in Figure 3.

Due to the overlap at the corner in the manner explained above, it follows that when the different blocks are set together, their corner portions are very firmly supported and reliance does not therefore have to be placed merely on the interlocking of their edge and end portions. Each corner of each block is actually directly supported by an underlying projecting portion of one or more of the adjacent blocks of the series.

In the exact form shown in Figures 1, and 2, the cross pieces 34 and 35 are separate and distinct from each other. In some cases the pieces 34 and 35 may be joined together into a single piece as shown by the dotted lines 45 in Figure 1, and likewise, the pieces 36 and 37 may be joined together into a single piece as shown by the dotted lines 46 in Figure 1. In fact the structure shown in Figure 3 includes cross pieces of this nature.

In Figure 4, I have shown an arrangement in which the cross pieces are designated 47, 48, and 49 respectively, the same being on the back or hidden side of the plate 30. Intermediate between these cross pieces are the blocks or strips of celotex or similar material 50 and 51 respectively. In the particular arrangement illustrated in Figure 5, the strips of celotex 50 and 51 are of greater thickness or depth than the cross pieces 47, 48, and 49, so that when the block is set into place, the cross pieces 47, 48 and 49 are located a greater distance from the surface of the concrete or permanent floor or structure than the surfaces of the celotex portions 50 and 51.

Furthermore, in the particular arrangement shown in Figures 4 and 5, I have placed strips of expanded metal or the like 52, 53, and 54 over the strips 47, 48, and 49, respectively, the edges of said expanded metal strips being carried down at the sides of the strips 47, 48, and 49, and preferably underlying the strips 50 and 51.

In practice, the bottom or hidden surfaces of the blocks, or the surface of the permanent or sub-floor of concrete or the like is first swept or covered with a layer of asphaltum or other soft or viscous mastic, so that as the blocks are set and pressed into place against the permanent structure and with their edges in proper inter-relationship, this asphaltum or other mastic will serve to cause the blocks to permanently adhere to the permanent structure in such interlocked relationship. The thickness of the asphaltum or other mastic material will naturally depend upon the size of the blocks and other factors of the structure, but generally a thickness of one-eighth inch will be found satisfactory for blocks of ordinary size, depending on the roughness of the sub-floor.

It will be understood that the asphaltum or mastic establishes its first and principal contact with the surfaces of the block which are closest to the surface of the sub-floor or other permanent structure. Such being the case, the lower or concealed surface of the strips 50 and 51 will adhere to the asphaltum or other mastic, but principally the projecting portions of the expanded metal strips 52, 53, and 54 will become embedded in the soft or viscous asphaltum or mastic, so that the adherence of the blocks will be properly produced by the presence of the expanded metal strips or surfacings. As already explained, the fibrous nature of the celotex is such that it will not have a very great amount of tensile strength to retain the blocks in place under the above conditions, but nevertheless, the contact and adherence of the celotex or similar strips with the asphaltum or mastic will insure a cushioning contact and support of the plate 30 by the pressure of the celotex strips against the layer of asphaltum or mastic.

In connection with the foregoing, the asphaltum or mastic will ordinarily not completely fill the spaces within the expanded metal to the surfaces of the strips 47, 48, and 49, but there will be open spaces or the like within said spaces. Furthermore, the expanded metal strips themselves will exert a certain amount of cushioning action so that these strips also will be supported in a cushioning manner by the metal lath. This function is in addition to their function of sealing or retaining the blocks in place with respect to the permanent structure.

In connection with the foregoing, it may be noted that the function of retaining the blocks in place with respect to the sub-floor or permanent structure is performed almost entirely by the intermediate strips 47, 48, and 49, which in the arrangement of Figures 4 and 5, are surfaced with the expanded metal strips. Referring to the sections shown in Figures 8 and 9, the layer of asphatum or other mastic is shown at 55, between the blocks and the permanent floor or structure 56.

In Figures 8 and 9, I have also shown the manner in which blocks embodying the present invention may be used for producing the finished ceiling of one room and the finished floor of the room above, as well as the manner in which the permanent concrete structure of said floor may be built up. In these figures, the temporary wood forms are first established in the usual manner, including for example, the cross pieces or beams 57 upon which are laid and supported the planks 58. The blocks of the present invention are then laid on the planks 58 of these forms as shown at 59, said blocks being placed with their finished or exposed surfaces against the planks and facing downwardly. There is then brushed or swept over the top surfaces of the blocks 59 a layer of asphaltum or mastic as shown at 60. This material will work down into the joints between the consecutive blocks and serve to lock the same firmly together as well as producing a stiffening and more permanent structure. At the same time the top surface of the ceiling is therefore waterproofed and protected. This will also protect said ceiling from any damage due to penetration of water or the like while the subsequent construction operations of pouring concrete or the like are being performed.

After the above operations have been performed, the pan forms 61 are set down on to the ceiling blocks 59 in proper positions according to the concrete structure which is to be produced. Preferably the lower edges of these pans 61 are serrated as shown at 62 in Figure 9. After the pans have been set into place, further asphaltum may be worked down between the edges of the consecutive pans as shown at 63, being at the positions of the bottoms of the concrete joists to be produced, and some of this asphaltum will work through the serrations as shown at 64 in Figure 8. The penetration of the lower serrated edges of the pans 61 into the asphaltum or mastic will support the same with sufficient firmness so that no other support is necessary in order to give them the necessary lateral support when the concrete is poured.

After the forms have been placed as above explained, the concrete may be poured so as to establish the slab 56 and the intermediate joists 64 in the well understood manner.

After the concrete floor has been constructed, the forms including the beams 57 and the planks 58 are removed, whereupon the ceiling structure is left supported from the lower edges of the joists. The adherence of the asphaltum or mastic to the lower edges of the joists and to the lower edges of the pans 61 will provide a substantial sustaining force for the ceiling structure and blocks; but in some cases it may be desirable to provide additional supporting connection of the same with the joists. For this purpose, in some cases I may provide metal clips such as shown at 65, the same being driven into the ceiling blocks before the concrete is poured, so that when the concrete is poured, these clips will be imbedded in the concrete and establish a firm conection therewith. In other cases, it may be desirable to provide a very rough surface in conjunction with the asphaltum or mastic between the edges of the consecutive form pans before the concrete is poured, so that when the concrete is poured into place, it will serve more firmly to establish connection with the asphaltum or mastic. For this purpose, after the asphaltum has been placed on the ceiling blocks between the edges of the consecutive pans as shown at 63 in Figure 8, and before the asphaltum or mastic has hardened excessively, gravel or other roughening material may be scattered on this still soft asphaltum or mastic 63 so that it will become partially imbedded therein but will project above the same and will produce a very rough surface. Then when the concrete is poured into place, it will firmly bind to this roughened surface and establish a very strong connecting support for sustaining the ceiling after the forms have been removed. After the concrete has been poured as above explained, the flooring may be put into place on the top of the concrete 56 as shown in Figures 8 and 9, and according to the principles hereinbefore disclosed.

Referring to Figures 10, 11, 12, and 13, in this case each of the blocks includes the top or exposed plate 30, together with the cross strips 66 and 67 at the ends and the cross strip 68 in the middle portion of the back or concealed face of the plate 30. In the present case both of the blocks 66 and 67 are set back from the ends of the plate 30 as shown at 69 and 70, but they project beyond the side edges of the plate 30 as shown at 71 and 72, the projections 71 and 72 being substantially equal in amount to the back or offsetting 69 and 70.

The cross piece 68 is sufficiently short so that the projecting portions 71 and 72 of companion or complementary blocks will not be obstructed by cross piece 68 when the blocks are set together.

Referring to Figure 13, one manner of application and use of blocks of this type is clearly illustrated for production of a parquet flooring and a further discussion and description of this is not deemed to be necessary.

Referring to the arrangement of Figures 14, 15, 16, and 17, in this case each block includes a top or exposed plate 30, together with a cross piece on the bottom or concealed surface. In the particular construction illustrated, this bottom cross piece comprises two outside strips 73 and 74, the space between which may be left unoccupied or may be occupied by another strip 75. In the latter case, said strip 75 may be of the same material or different material from the strips 73 and 74. For example, the strips 73 and 74 may be of wood and the strip 75 may be of celotex or other fibrous material.

Referring to Figure 15 in particular, it will be noted that the plate 30 overhangs or projects beyond the strips 73 and 74 as shown at 76 and 77, but that conversely the strips 73 and 74 extend beyond the plate 30 in the other direction as shown at 78 and 79. At this point, it should be noted that the overlap at the points 78 and 79 should never be greater than the overhang as shown at 76 and 77 in order to make it possible for the top plates to come into direct edge contact when the blocks are set together to build up the structure.

Referring to Figure 17, one manner of application and use of these blocks will be readily apparent and it is not deemed necessary to make a detailed description of the same. It may be remarked, however, that the plates 30 are square so that a different appearance of structure is produced from that of arrangements previously explained in detail.

In each of the arrangements shown in Figures 18 to 24 and 25 inclusive, there is a rectangular plate 30 for the exposed or top surface of the block.

Figure 18:
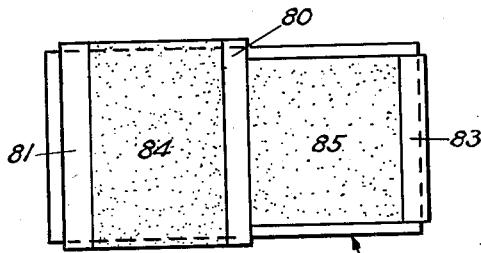

In the arrangement of Figure 18, the back or concealed surface is provided with cross pieces 80 and 81 beneath or behind one end of the plate, and with a cross piece 83 beneath or behind the other end of the plate. The pieces or strips 80 and 81 are relatively narrow and provide a relatively large pocket within which is located the yieldable or compressible plate 84. Likewise, the strip 83 is relatively narrow and is located at the extreme end of the plate 30, so that a relatively large plate 85 of yieldable or compressible material may be placed between the strips 80 and 83. The strips 80, 81, and 83 are relatively narrow so that the total area of the block occupied by the yieldable or compressible plates 84 and 85 is a very much larger percentage of the total than any of the structures heretofore referred to, and may be considerably greater than 50%.

At this point, it may be remarked that the yieldable or compressible strips 50 and 51 in the form of Figures 1 to 5 inclusive, and 75 in the form of Figures 14, 15, 16, and 17, as well as other forms presently to be described, establish sound insulating surfaces or layers as well as performing their cushioning function, so that the blocks of the present structure are very well adapted for use in locations where it is desired to deaden the transmission of sound.

Figure 19:
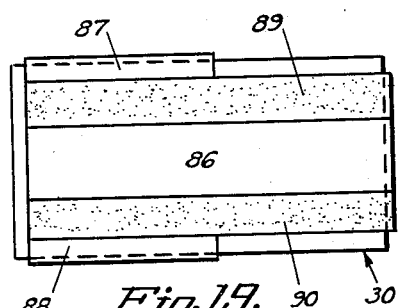

In the arrangement of Figure 19, the back of the plate 30 is provided with a longitudinally extending strip 86 along its central portion and with relatively short edge strips 87 and 88 along its side portions, together with intermediate strips of celotex or other relatively yieldable material 89 and 90 located between said strips.

Figure 20:
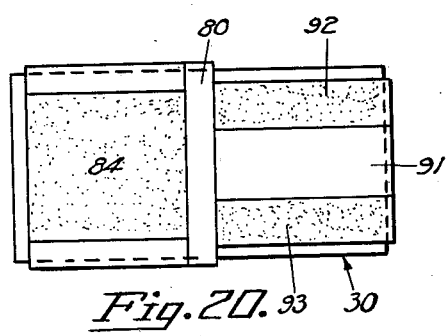

The arrangement of Figure 20 is similar to that of Figure 18, with the exception that the strip 83 has been eliminated, and in place thereof, there has been substituted a central longitudinally extending strip 91 of wood or the like, together with side strips of yieldable or cushion material 92 and 93.

Figure 21:
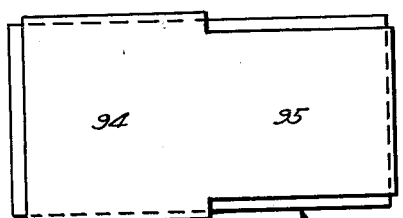

In the arrangement of Figure 21, the back face of the block includes the plates 94 and 95 which are relatively of proper form and size to establish the desired interlocking and overlapping relationships. In some cases these plates 94 and 95 may be integral or a single plate as illustrated in Figure 21.

Figure 22:
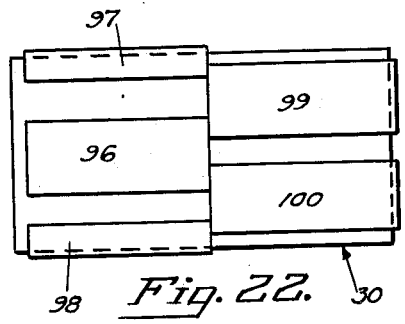
Figure 23:
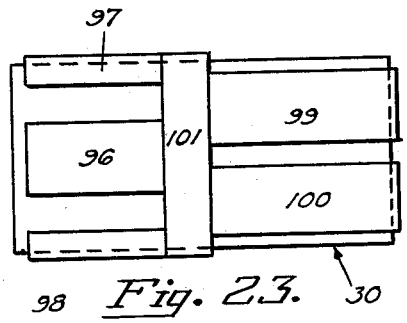

In the arrangement of Figure 22, there is provided a series of longitudinally extending blocks 96, 97 and 98 at the back or concealed side of one end of the plate 30, and the other strips 99 and 100 at the back or concealed side of the other end of the plate. The arrangement of Figure 23 is similar to that of Figure 22 with the exception that a cross strip or the like 101 is placed between the adjoining ends of the strips 96—97—98 and 99—100 at the other end of the plate.

In the arrangement of Figures 24 and 25, there is provided a series of strips 102, 103, and 104 longitudinally extending beneath one end of the plate, and a block or strip 105 beneath the other end of the plate. In the present case, the plate 30 is formed at one end from a series of longitudinally extending strips 106, 107, 108, and at the other end from a series of transversely or cross-wise extending strips 109, 110, and 111. The strip 105 on the back side of one end provides adequate support for the strips 109, 110 and 111; and the strip 103 is of sufficient width to provide adequate support at the other end for the strips 106, 107, and 108.

It will be understood that in all of the forms shown in Figures 18 to 24 and 25 inclusive, as well as the form disclosed in Figures 1, 2, 3, 4, and 5, the top or exposed plate and the strips or pieces on the back side thereof, bear the proper relationship to each other to establish the desired interlocking when the various blocks are set together, said interlocking being established along the edges and ends of the blocks as well as at their corners, all as hereinbefore set forth.

In the modified construction illustrated in Figures 26, 27, 28, 30, and 31, the ceiling blocks are of somewhat different form. In this case, each of said blocks includes a plate or panel 112 together with the projecting portions 113 and 114 at its back side. Each of these blocks 112 is provided with a groove 115 along one of its back side edges and with a cross groove 116 across one of its back end edges. Preferably also, there is another groove 117 extending across the central portion of the back of the block. Each of these blocks 112 may be of built up construction or may be formed as one integral unit, the latter being the preferred construction.

Referring to Figures 26, and 27, in particular, the method of construction making use of these blocks is therein illustrated. In this case there are shown forms including the horizontal planks 118, together with the cross beams 119 by which the same are supported. The ceiling blocks 112 are then set in place on this form with their finished or exposed surfaces facing downwardly against the form, and the edges of the blocks are set together as shown in Figure 26. When the blocks have been set into this position, the edge grooves 115 and 116 will establish a series of longitudinally and transversely extending interlocking grooves into which there may be then set reinforcement bars 120 as shown in the different figures. After the reinforcement bars have been set into place as above explained, a layer of asphalt or other mastic 121 is placed over the top surfaces of the ceiling blocks, the same being worked down into the grooves between the back faces of the blocks and around the reinforcement bars 120. In some cases, if desired additional reinforcement may be provided in the form, for example, of other bars or expanded metal 122, or triangular wire mesh, the same being placed over the top faces of the blocks before the asphaltum or mastic 121 is applied, so that the same will be imbedded therein.

The form pans 123 are then set into place with their lower edges slightly imbedded in the asphaltum or mastic 121 in accordance with the principles already explained in reference to Figures 8 and 9.

After the concrete 124 has been poured above the forms 123, the forms 118 and 119 may be removed so as to leave the ceiling blocks 112 exposed as will be readily apparent.

In the construction of Figure 26, there are also shown the interlocking members such as nails or clips 125 which improve the interlocking connection between the concrete 124 and the ceiling blocks 112 much according to the principles of the clips 65 shown in Figure 8.

In the modified form of Figure 28, ceiling blocks 112 have been eliminated. In place thereof, after the form boards 118 have been set up and properly supported, there is spread over the top surface thereof a dry mixture of suitable material such as plaster, cement, sand, or other ingredients in the proper proportions so that the same will set when the mixture is moistened. This is the mixture shown by the layer 126 in Figure 28. I have also shown suitable reinforcement bars or wire mesh or the like 127 imbedded therein.

After this dry mixture 126 has been spread into place, the pan forms 128 may be set up with their lower edges pressed down into this dry mixture 126 to a proper distance from the form 118. It will generally be desirable to place clips or the like 129 into place at the positions of the lower edges of the form pans 128 before said pans are set into place. Each of these clips includes a cross-piece or the like 130, the outer edge portions 131 and 132 of which serve to sustain and position the lower edge portions of the pans 128. Each of said clips 129 also includes the downwardly extending fingers or feet 133 and 134 which rest upon and are supported by the forms 118 before the material is set, and serve to support the clips 129 at the exact desired elevation, thereby also supporting the form pans 128 in the proper positions. Each of said clips 129 also includes upwardly extending fingers 135 and 136 which establish pockets within which may be laid the reinforcing bars 137 so that said bars will be held in the proper places.

After the forms have all been set up as above explained, water is run in on to the dry mix 126 in sufficient quantity to hydrate and set the same. At the same time, or immediately thereafter and before the setting has been completed, the concrete 138 is poured above the pans 128 and down into the spaces between said pans so that said concrete will join directly to the hydrating material of which the ceiling itself is made. In this way a monolithic structure is produced in which the ceiling material is permanently and monolithically connected to the concrete of the floor structure.

While I have herein shown and described only certain embodiments of the features of my present invention, still I do not intend thereby to limit myself thereto except as I may do so in the claims.

I claim:

1. The method of constructing an integrally formed concrete and ceiling structure for buildings which consists in supporting a dry mixture of suitable concrete materials in position on a horizontal form to establish the ceiling portion of the desired structure, then placing inverted forms for the floor structure in place directly above said dry mixture aforesaid for forming the concrete of the floor structure, then flowing water on to the dry mixture aforesaid in sufficient quantity to hydrate the same and substantially at the same time pouring the concrete down on to the super-supported floor forms, the edge portions of said floor forms being separated from each other a suitable distance for establishing joists between them and in contact with the dry mixture aforesaid, whereby the concrete of the floor structure and joists is integrally and monolithically joined to the hydrated concrete structure of the ceiling, substantially as described.

2. A surfacing or floor block with a front or exposed surface portion and a back or concealed surface portion, said block having at one end a projecting edge portion the full width of the back at that end and having at the other end an undercut edge portion the full width of the back at that end, the block being so formed that for a length substantially equal to one-half the length of the sides the edge of the back portion of the block extends beyond the edge of the front surface portion of the block, and the other one-half of the side edges of the block being recessed or undercut in the back portion thereof, substantially as described.

3. A flooring surface comprising a series of blocks having edge contact with each other, a side edge of one block adjoining the side edge of another block and the end edge of a third block, said edge of said first named block having a projecting edge portion entering into an undercut portion in the end edge of one of the other two blocks, said other block having a projecting side edge portion entering into an undercut in the end edge of the third block, said third block having a projecting side edge portion entering into an undercut in the side edge of the first mentioned block, and the projecting side edge portion of the first named block reaching past the corner of the second mentioned block and underlying the corner of the third mentioned block to thereby establish a complete interlocking support for the junction at the point where all of said blocks come together, substantially as described.

4. A surfacing comprising a series of interlocking flooring blocks, each having a front or exposed surface portion and a back or concealed surface portion, the front portion of each block being rectangular and for a length substantially equal to one-half the length of the sides the blocks have projecting side edge portions and undercut side edge portions on the other halves of their sides, the projecting side edge portion on the side of one block entering the undercut end portion in the end of another block and the projecting side edge portion of the side of the last mentioned block entering an undercut in the end of another block, and the projecting side edge portion on the side of the last mentioned block entering the undercut in the side of the first mentioned block, substantially as described.

5. A surfacing comprising a series of interlocking flooring blocks each having a front or exposed surface portion and a back or concealed surface portion, the front surface portion of each block being rectangular and for a length substantially equal to one-half the length of each block the sides have projecting side edge portions, and an undercut edge portion on the other one-half of the sides thereof, the projecting side edge portion on the side of one block entering the undercut in the side of an adjoining block and the projecting end edge portion on the end of the last mentioned block entering the undercut in the side of another block, and the projecting end edge portion on the end of the last mentioned block entering the undercut in the side of the first mentioned block, substantially as described.

6. As a new article of manufacture, a rectangular block for the purpose specified, said block having the edge portions of two parallel sides formed on its concealed surface for the entire length of said sides in alternation with projecting edge portions and undercut edge portions, whereby there is produced a projection on one side directly opposite to a projection on the other side of the block and an undercut on one side directly opposite to an undercut on the other side of the block, the other two edges of the block being undercut or having projecting edge portions on the back surface thereof for the entire width of the back portion, substantially as described.

7. A rectangular block having projecting edge portions on two opposite sides in length substantially equal to one-half the length of said two sides adapted to underlie undercut portions in the edges of adjoining blocks, and the end of the block which has the projecting edge portions on its sides having an undercut in its end for the entire width of said block, so that the series of projections and undercuts alternate around the edges of the block, changing from an undercut to a projection at intervals of a distance substantially equal to the width of the block, substantially as described.

8. A rectangular block having undercut edge portions on two opposite sides in length substantially equal to one-half the length of said two sides adapted to overlie projecting portions in the edges of adjoining blocks, and the end of the block which has the undercut edge portions on its sides having a projection in its end for the entire width of the back portion of the block, so that the series of projections and undercuts alternate around the edges of the block, changing from an undercut to a projection at intervals of a distance substantially equal to the width of said block, substantially as described.

9. A surfacing comprising a series of interlocking flooring blocks, each having a front or exposed surface portion and a back or concealed surface portion in proximity to a permanent structure, the edge portions of two parallel sides of each block being formed on the concealed surface portion thereof for the entire length of said sides in alternation with projecting edge portions and undercut edge portions, a substantial area or portion of the back of the block being composed of fibrous cushionable material, and the other area or portion of the block being made of wood or other more rigid material, substantially as described.

10. A surfacing comprising a series of interlocking flooring blocks, each having a front or exposed surface portion and a back or concealed surface portion in proximity to a permanent structure, the edge portions of two parallel sides of each block being formed on the concealed surface portion thereof for the entire length of said sides in alternation with projecting edge portions and undercut edge portions, a substantial area or portion of the back of the block being composed of fibrous cushionable material, and the other area or portion of the block being made of wood or other more rigid material, and the fibrous cushionable material being of greater depth than the other portions of the block, thereby leaving a larger space between the permanent structure and the wood or harder material than between the fibrous or softer material and the permanent structure, to allow for a thicker layer of asphalt or relatively soft bonding mastic under the harder portion of the block, thereby establishing a cushioning connection between the permanent structure and the finished floor surface, substantially as described.

11. A surfacing comprising a series of interlocking flooring blocks, each having a front or exposed surface portion and a back or concealed surface portion in proximity to a permanent structure, the edge portion of two parallel sides of each block being formed on the concealed surface portion thereof for the entire length of said sides in alternation with projecting edge portions and undercut edge portions, a substantial area or portion of the back of the block being composed of fibrous cushionable material, and the other area or portion of the block being made of wood or other more rigid material, and the fibrous or cushioning material being of greater depth than the other area or portion of the block, thereby leaving a larger space between the permanent structure and the wood or harder material than between the fibrous or softer material and the permanent structure, and a compressible member of expanded metal lath attached to the area of wood or harder material which projects towards the permanent structure substantially the same distance as the fibrous or softer material, and suitable asphaltum or masting connecting the projecting portion of the expanded metal or the like to the permanent structure, substantially as described.

12. A surfacing comprising a series of interlocking flooring blocks, each having a front or exposed surface portion and a back or concealed surface portion in proximity to a permanent structure, the edge portions of two parallel sides of each block being formed on the concealed surface portion thereof for the entire length of said sides in alternation with projecting edge portions and undercut edge portions, a substantial area or portion of the back of the block being composed of fibrous cushioning material, and the other area or portion of the block being made of wood or other more rigid material, and the fibrous or cushionable material being of greater depth than the other area or portion of the back, leaving a larger space between the permanent structure and the wood or harder material than between the fibrous or softer material and the permanent structure, the flooring block being supported on the area having the fibrous or compressible material of low tensile strength and being tied down to the permanent structure from the area of wood or harder material by means of compressible material of higher tensile strength than the material used in the other area of fibrous or softer material, thereby establishing a cushioning connection between the permanent structure and the finished floor surface, substantially as described.

13. In a building structure, a ceiling composed of a series of blocks constructed integrally with the concrete joists of a floor slab, said series of blocks being supported in position on a horizontal form to establish a ceiling portion, each block having a front or exposed surface and a back or concealed surface, the two parallel sides of each block being formed on its concealed surface for the entire length of said sides alternately with projecting edge portions and undercut edge portions, the edge portions of adjacent blocks being located in contact with each other, the face or exposed surface of each block being placed downward on the horizontal forms, asphalt or other suitable mastic or the like on the top of the concealed surfaces of the blocks, inverted floor forms for the floor structure in place directly above said blocks and asphaltum to form the concrete of the floor structure, the edge portions of said floor forms being separated from each other a suitable distance to establish joists between them and in contact with the asphaltum, and means for establishing a permanent bond between the series of blocks and the concrete joists, substantially as described.

14. In a building structure, a ceiling composed of a series of blocks constructed integrally with the concrete joists of a floor slab, said series of blocks being supported in position on a horizontal form to establish a ceiling portion, each block having a front or exposed surface and a back or concealed surface, the two parallel sides of each block being formed on its concealed surface for the entire length of said sides alternately with projecting edge portions and undercut edge portions, the edge portions of adjacent blocks being located in contact with each other, the face or exposed surface of each block being placed downward on the horizontal forms, a layer of reinforcing material located over the top or concealed surface of the blocks, asphalt or other suitable mastic or the like on the top of the concealed surfaces of the blocks and around said reinforcing materials, inverted floor forms for the floor structures in place directly above said blocks and asphaltum to form the concrete of the floor structure, the edge portions of said floor forms being separated from each other a suitable distance of establish joists between them and in contact with the asphaltum, and means for establishing a permanent bond between the series of blocks and the concrete joists, substantially as described.

AXEL G. W. WEDBERG.